(12) United States Patent
Huang

(10) Patent No.: US 7,636,208 B2
(45) Date of Patent: Dec. 22, 2009

(54) LENS MODULE

(75) Inventor: Chien-Feng Huang, Taipei Hsien (TW)

(73) Assignee: Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 0 days.

(21) Appl. No.: 12/052,076

(22) Filed: Mar. 20, 2008

(65) Prior Publication Data

US 2008/0316620 A1 Dec. 25, 2008

(30) Foreign Application Priority Data

Jun. 22, 2007 (CN) .................. 2007 1 0200867

(51) Int. Cl.
*G02B 7/02* (2006.01)

(52) U.S. Cl. ...................... 359/819; 359/811

(58) Field of Classification Search .................. 359/819
See application file for complete search history.

(56) References Cited

U.S. PATENT DOCUMENTS 6,791,766 B2 * 9/2004 Nishikawa .................. 359/811

* cited by examiner

*Primary Examiner*—Jordan M. Schwartz
*Assistant Examiner*—James C Jones
(74) *Attorney, Agent, or Firm*—Andrew C. Cheng

(57) ABSTRACT

A lens module includes a barrel and a first lens. The barrel has a body and a step-profiled part. The step-profiled part is inwardly extended from an inside wall of the body. The first lens is accommodated in the barrel. The first lens has a first step-profiled structure disposed around the circumference thereof. The first step-profiled structure is formed corresponding to the step-profiled part so as to fasten the first lens to the barrel.

9 Claims, 3 Drawing Sheets

LENS MODULE

BACKGROUND

1. Technical Field

The invention relates generally to optical modules, and more particularly to a lens module.

2. Description of Related Art

Currently, along with the development of electronic devices with multiple functions, image pick-up apparatuses have become widely used in a variety of consumer electronic devices, such as notebook computers, personal digital assistants (PDAs), cellular telephones, etc. In the meantime, there is an increasingly demand for improving image quality, which is essentially depended on the quality of a lens module of the image pick-up apparatus. That is, it is a need for developing lens modules with high image quality.

Referring to FIG. 3, a typical lens module 200 includes a barrel 221, a first lens 222, a spacer 223 and a second lens 224. The first lens 222, the spacer 223, and the second lens 224 are accommodated in the barrel 221 sequentially. In addition, the first lens 222, the spacer 223, and the second lens 224 are assembled along an axis direction of the barrel 221 in order to perform optical function. Particularly, such optical elements 222, 223, 224 are put into the barrel 221 in a direction parallel to the optical axis of the lens module 200. Thus, the first lens 222 and the second lens 224 can be maintained in the barrel 221 by way of allowing lateral sides of the lenses 222, 224 to abut against an inside wall of the barrel 221.

In such case, in order to ensure that the lenses 222, 224 can be precisely and firmly mounted inside the barrel 221, the lenses 222, 224 must be precisely manufactured with the external diameter thereof substantially equal to the inner diameter of the barrel 221. However, the equal diameters cause friction between the lateral sides of the lenses 222, 224 and the inside wall of the barrel 221. Therefore, it is understood that the friction makes it difficult to assembling the lenses 222, 224 with the barrel 221. Accordingly, the lenses 222, 224 may be placed improperly in the barrel 221, e.g. not straightly. As a result, the assembling efficiency is lowered and the image quality of the yielded lens module 200 is unsatisfactory. Furthermore, yield for lens module 200 is reduced and cost for that is raised.

What is needed, therefore, is a lens module having improved efficiency on assembling and improved performance on optical quality.

SUMMARY

A lens module is provided. In one present embodiment, the lens module includes a barrel and a first lens. The barrel has a cylindrical body and an inner annular stepped part formed in the cylindrical body. The inner annular stepped part includes a first upward-facing step surface, a second upward-facing step surface and an intermediate side surface interconnected between the first upward-facing step surface and the second upward-facing step surface. The first lens is accommodated in the barrel. The first lens has a first central round portion and a first peripheral stepped structure surrounding the first central round portion. The first peripheral stepped structure includes a first downward-facing step surface, a second downward-facing step surface, and a first lateral surface interconnected between the first downward-facing step surface and the second downward-facing step surface. The first lens is engaged in the inner annular stepped part in a manner that the second upward-facing step surface of the inner annular stepped part contacts the second downward-facing step surface of the first lens, the first upward-facing step surface of the inner annular stepped part faces toward the first downward-facing step surface of the first lens, and the intermediate side surface of the inner annular stepped part contacts the first lateral surface of the first lens.

Advantages and novel features of the present lens module will become more apparent from the following detailed description of preferred embodiments when taken in conjunction with the accompanying drawings.

BRIEF DESCRIPTION OF THE DRAWINGS

The components in the drawing are not necessarily drawn to scale, the emphasis instead being placed upon clearly illustrating the principles of the present invention.

Corresponding reference characters indicate corresponding parts. The exemplifications set out herein illustrate at least one preferred embodiment of the present lens module, in one form, and such exemplifications are not to be construed as limiting the scope of the invention in any manner.

DETAILED DESCRIPTION OF THE EMBODIMENT

Reference will now be made to the drawings to describe embodiments of the present lens module in detail.

Figure 1:
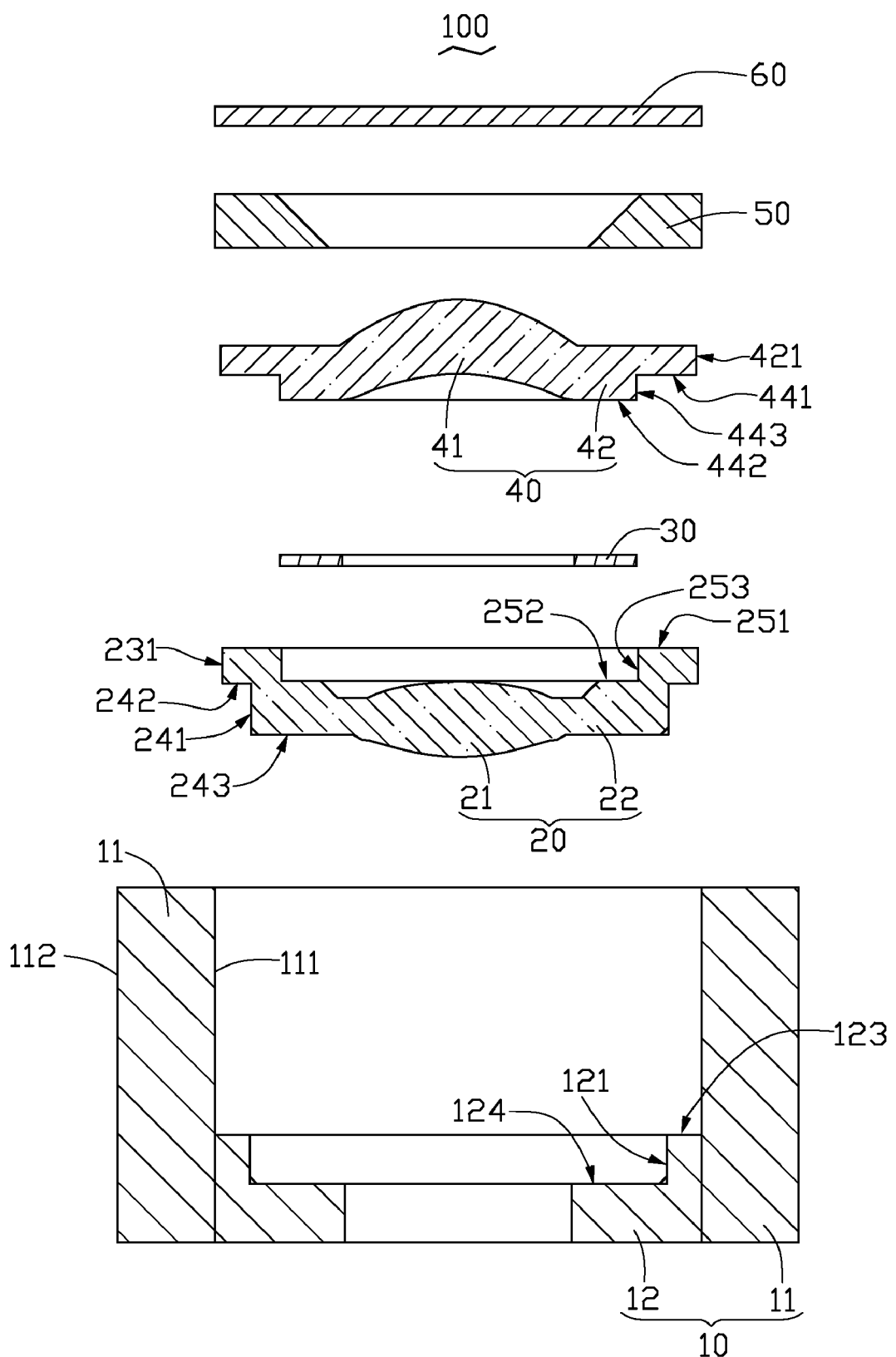
FIG. 1 is an exploded view of a lens module in accordance with a preferred embodiment of the present invention.
Figure 2:
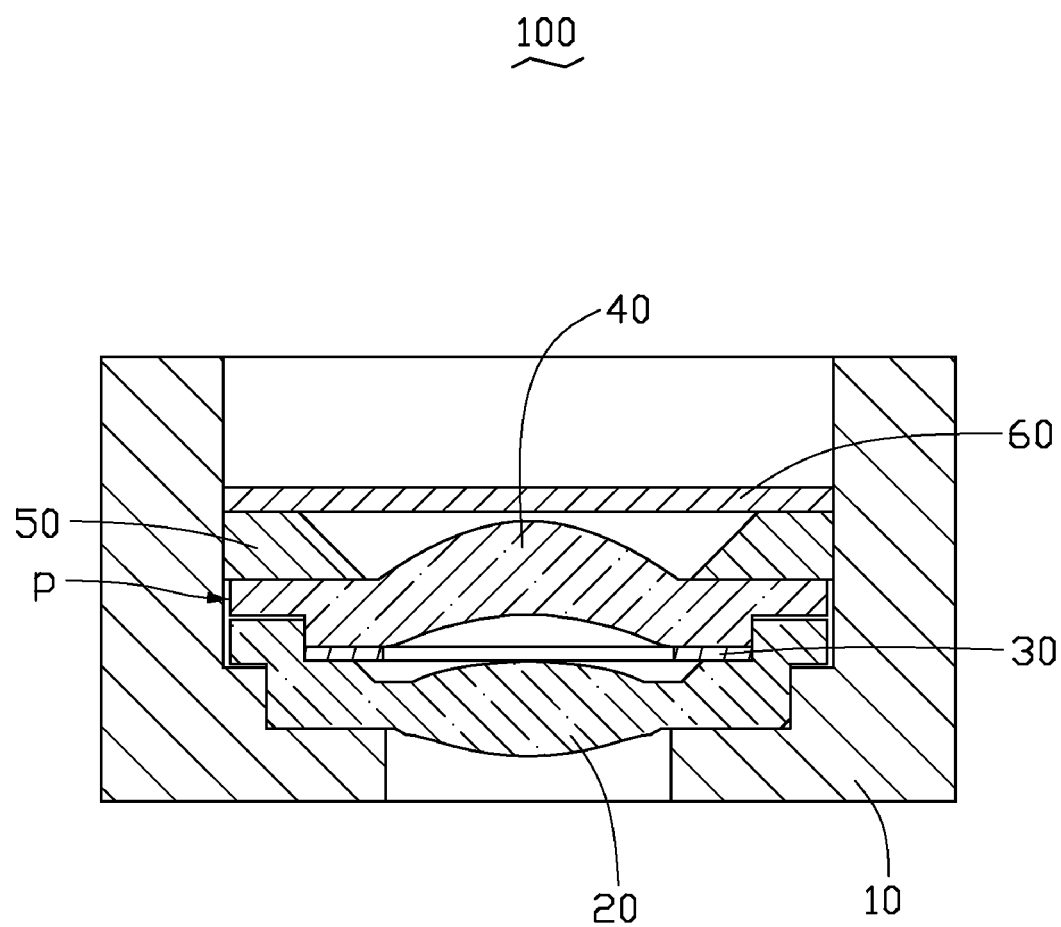
FIG. 2 is a cross-sectional view of a lens module in accordance with a preferred embodiment of the present invention.
Figure 3:
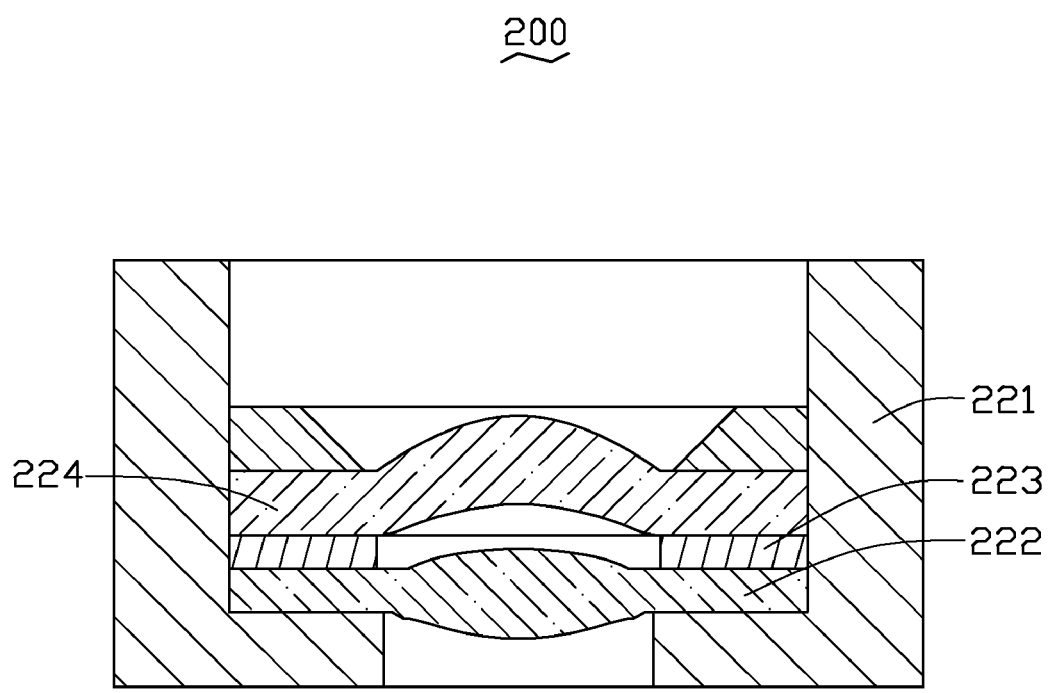
FIG. 3 is a cross-sectional view of a conventional lens module.

Referring to FIG. 1 and FIG. 2, a lens module 100 in accordance with a present embodiment, is shown. The lens module 100 includes a barrel 10 and a first lens 20. In the present embodiment, the lens module 100 can be installed into the electronic devices, such as notebook computers, personal digital assistants (PDAs), or cellular telephones.

The barrel 10 is a cylindrical barrel and can be made of resin. The barrel 10 defines an inner space therein to accommodate the first lens 20. In the present embodiment, the barrel 10 includes a cylindrical body 11 and an inner annular stepped part 12. The cylindrical body 11 has an inside wall 111 and an external wall 112 opposite to each other. Advantageously, the external wall 112 of the barrel 10 has a plurality of threads (not shown) formed thereon so that the barrel 10 can be screwed to a holder (not shown).

The inner annular stepped part 12 is formed in the cylindrical body 11. Particularly, the inner annular stepped part 12 is inwardly extended from the cylindrical body 11 at a lower end of the cylindrical body 11. The inner annular stepped part 12 has a first upward-facing step surface 123, a second upward-facing step surface 124 and a intermediate side surface 121 interconnected between the first and second upward-facing step surfaces 123, 124. The inner annular stepped part 12 is configured to hold the first lens 20. In such case, the inner annular stepped part 12 and the cylindrical body 11 can be integrally formed. Alternatively, the inner annular stepped part 12 and the cylindrical body 11 can be separately made and are assembled into a whole barrel 10.

The first lens 20 is accommodated in the barrel 10. The first lens 20 includes a central round portion 21 and a peripheral stepped structure 22 surrounding the central round portion 21. The central round portion 21 is configured to perform image picking-up function. The peripheral stepped structure 22 is configured for abutting against the inner annular stepped part 12 of the barrel 10 so as to fasten the first lens 20 to the barrel 10. The first lens 20 has a first downward-facing step surface 242, second downward-facing step surface 243 and an first lateral surface 241 interconnected between the first and second downward-facing step surfaces 242, 243.

Referring to FIG. 2, in assembly, the first lateral surface 241 of the first lens 20 contacts the intermediate side surface 121 of the inner annular stepped part 12 so as to engage the first lens 20 in the inner annular stepped part 12. That is, an external diameter of portion of the first lens 20 where the first lateral surface 241 located is substantially equal to an internal diameter of portion of the barrel 10 where the intermediate side surface 121 located. In addition, the second downward-facing step surface 243 of the first lens 20 faces toward the second upward-facing step surface 124 of the inner annular stepped part 12, and the first downward-facing step surface 242 of the first lens 20 faces toward the first upward-facing step surface 123 of the inner annular stepped part 12. In the present embodiment, the first lateral surface 241 of the first lens 20 can be larger than or equal to that of the intermediate side surface 121 of the inner annular stepped part 12. For example, when the first lateral surface 241 is larger than that of the intermediate side surface 121 of the inner annular stepped part 12, the second upward-facing step surface 124 of the inner annular stepped part 12 is coincided with the second downward-facing step surface 243 of the first lens 20 so that the second upward-facing step surface 124 of the inner annular stepped part 12 can provide an enhanced supporting for the first lens 20.

Certainly, the first lens 20 can be engaged in the inner annular stepped part 12 just through contacting the first lateral surface 241 of the first lens 20 with the intermediate side surface 121 of the inner annular stepped part 12.

In the present embodiment, a gap P is maintained between a second lateral surface 231 of the first lens 20 and the inside wall 111 of the cylindrical body 11. That is, the outside most lateral surface 231 of the first lens 20 spaces apart from the inside wall 111 of the barrel 10 by such gap P. In such case, an external diameter for the lateral surface 231 of the first lens 20 is smaller than an internal diameter for the inside wall 111 of the cylindrical body 11. Therefore, during the assembling process, the friction between the first lens 20 and the barrel 10 can be avoided effectively. That is, the whole first lens 20 is only through portion thereof, i.e. the first lateral surface 241 thereof, against the barrel 10 for securing to the barrel 10. Therefore, the friction is minimized and the first lens 20 accommodated in the barrel 10 can be prevented from being aslant.

Referring to FIG. 1 and FIG. 2, preferably the lens module 100 of present embodiment further includes a second lens 40, which is accommodated in the barrel 10. In order to engage the second lens 40 in the barrel 10, the first lens 20 correspondingly has a first upward-facing step surface 251, a second upward-facing step surface 252 and an intermediate side surface 253 interconnected between the first upward-facing step surface 251 and the second upward-facing step surface 252.

The second lens 40 includes a central round portion 41 used for picking up the image and a peripheral stepped structure 42 used for abutting against the first lens 20. The peripheral stepped structure 42 surrounding the central round portion 41. The peripheral stepped structure 42 of the second lens 40 has a first downward-facing step surface 441, a second downward-facing step surface 442, and a first lateral surface 443 interconnected between the first downward-facing step surface 441 and second downward-facing step surface 442. The second lens 40 is engaged in the peripheral stepped structure 22 of the first lens 20 in a manner that the first lateral surface 443 of the second lens 40 contacts the intermediate side surface 253 of the first lens 20, the first upward-facing step surface 251 of the first lens 20 faces toward the first downward-facing step surface 441 of the second lens 40, and the second upward-facing step surface 252 of the first lens 20 faces toward the second downward-facing step surface 442 of the second lens 40.

Furthermore, the gap P is also maintained between a second lateral surface 421 of the second lens 40 and the inside wall 111 of the barrel 10. That is, an external diameter for the outside most lateral surface of the second lens 40 is smaller than an internal diameter for the inside wall 111 of the barrel 10. Therefore, the second lens 40 is engaged in the first lens 20 through contacting the first lateral surface 443 of the second lens 40 to the intermediate side surface 253 of the first lens 20 but the friction between the second lens 40 and the inner wall 111 of the barrel 10 is not generated. It is understood that assembling the lenses 20, 40 with such the step-profiled structures into the barrel 10 is easier. In addition, the second lens 40 can be easily placed in the right position if the first lens 20 is placed in the right position.

As mentioned above, the lens module 100 of the present embodiment can includes a spacer 30 disposed between the first lens 20 and the second lens 40. The spacer 30 is used to space apart from the first lens 20 and the second lens 40 to keep a suitable distance.

It is reasonably that the lens module 100 can include more than two lenses to be assembled in the barrel 10. The lenses are engaged tightly to each other through the step-profiled structures formed thereon. In addition, the lens module 100 can further include an infrared-cut filter 60 accommodated in the barrel 10, as shown in FIG. 1. The infrared-cut filter 60 is configured to block the infrared light from passing. In the present embodiment, the lenses 20, 40 and the infrared-cut filter 60 are spaced to keep suitable distance by the spaces 30, 50. In addition, the glue can be used for fastening such the optical elements 20, 40, 60 more tightly.

In conclusion, the lens module of the present embodiment utilizes the step-profiled structure to engage the optical elements to each other. Additionally, such the optical elements space apart from the inner wall of the barrel by a gap to avoid the friction generation. Therefore, it is favorable to assemble such optical elements and the assembling efficiency is raised. In the meantime, the lenses are positioned precisely to guarantee the image quality so that yield for the lens module is increased and cost for the lens module is reduced.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A lens module, comprising:
   a barrel having a cylindrical body and an inner annular stepped part formed in the cylindrical body, the inner annular stepped part including a first upward-facing step surface, a second upward-facing step surface and an intermediate side surface interconnected between the first upward-facing step surface and the second upward-facing step surface; and
   a first lens accommodated in the barrel, the first lens having a central round portion, a peripheral stepped structure surrounding the central round portion, the peripheral stepped structure including a first downward-facing step surface, a second downward-facing step surface, a first lateral surface interconnected between the first downward-facing step surface and the second downward-facing step surface, the first lens being engaged in the inner annular stepped part in a manner that the intermediate side surface of the inner annular stepped part contacts the first lateral surface of the first lens, the first upward-facing step surface of the inner annular stepped part faces toward the first downward-facing step surface of the first lens, and the second upward-facing step surface of the inner annular stepped part faces toward the second downward-facing step surface of the first lens.

2. The lens module as claimed in claim 1, wherein a gap is maintained between a second lateral surface of the first lens and an inner surface of the cylindrical body of the barrel.

3. The lens module as claimed in claim 1, wherein the first lateral surface of the first lens is larger than or equal to the intermediate side surface of the inner annular stepped part.

4. The lens module as claimed in claim 1, wherein the first lens has a first upward-facing step surface, a second upward-facing step surface and an intermediate side surface interconnected between the first upward-facing step surface and the second upward-facing step surface.

5. The lens module as claimed in claim 4, further comprising:
   a second lens accommodated in the barrel, the second lens having a central round portion and a peripheral stepped structure surrounding the central round portion, the peripheral stepped structure of the second lens including a first downward-facing step surface, a second downward-facing step surface, and a first lateral surface interconnected between the first downward-facing step surface and second downward-facing step surface, the second lens being engaged in the peripheral stepped structure of the first lens in a manner that the first lateral surface of the second lens contacts the intermediate side surface of the first lens, the first upward-facing step surface of the first lens faces toward the first downward-facing step surface of the second lens, and the second upward-facing step surface of the first lens faces toward the second downward-facing step surface of the second lens.

6. The lens module as claimed in claim 5, wherein a gap is maintained between a second lateral surface of the second lens and an inner surface of the cylindrical body of the barrel.

7. The lens module as claimed in claim 5, wherein the first lens or the second lens is made of plastic or glass.

8. The lens module as claimed in claim 5, further comprising:
   a spacer disposed between the first lens and the second lens.

9. The lens module as claimed in claim 1, further comprising:
   an infrared-cut filter accommodated in the barrel.

* * * * *